United States Patent [19]

Zlotek

[11] Patent Number: 4,756,395
[45] Date of Patent: Jul. 12, 1988

[54] OVERRUNNING CLUTCH WITH CONTROLLED SPRAG ACTION

[75] Inventor: Thaddeus F. Zlotek, Center Line, Mich.

[73] Assignee: Dana Corporation, Toledo, Ohio

[21] Appl. No.: 804,802

[22] Filed: Dec. 3, 1985

[51] Int. Cl.⁴ ............................................. F16D 41/07
[52] U.S. Cl. ................................. 192/41 A; 192/45.1
[58] Field of Search .................... 192/41.A, 45.1; 188/82.7

[56] References Cited

U.S. PATENT DOCUMENTS

| | | | |
|---|---|---|---|
| 2,683,509 | 7/1954 | Jandasek | 192/45.1 |
| 2,832,450 | 4/1958 | Wade | 192/45.1 |
| 2,888,116 | 5/1959 | Troendly et al. | 192/45.1 |
| 2,916,124 | 12/1959 | Troendly et al. | 192/45.1 |
| 3,175,661 | 3/1965 | Mauer et al. | 192/45.1 |
| 3,545,581 | 12/1970 | Kent | 192/45.1 |
| 3,702,649 | 11/1972 | Giese et al. | 192/41 A |
| 3,844,391 | 10/1974 | Hallerberg | 192/41 A |
| 3,997,041 | 12/1976 | Judd et al. | 192/41 A |

FOREIGN PATENT DOCUMENTS

| | | |
|---|---|---|
| 611752 | 11/1948 | United Kingdom . |
| 871537 | 6/1961 | United Kingdom . |
| 925030 | 5/1963 | United Kingdom . |
| 987892 | 3/1965 | United Kingdom . |
| 1200676 | 7/1970 | United Kingdom . |
| 1291094 | 9/1972 | United Kingdom . |
| 1428476 | 3/1976 | United Kingdom . |

Primary Examiner—Rodney H. Bonck
Assistant Examiner—Richard M. Lorence
Attorney, Agent, or Firm—Brooks & Kushman

[57] ABSTRACT

An overrunning clutch includes an actuating ring to displace sprags from the race surfaces in the overrunning mode to reduce sprag wear. The actuating ring is positioned in the radial space between the inner and outer races and is cooperative with the sprag retainer to lift the sprags from engagement with the race surfaces in the overrunning mode. In a first embodiment, an actuating ring carries a plurality of circumference distributed tilt pads which are spaced axially from the sprags. Each tilt pad is pivotally mounted on the actuating ring and includes a shoe portion. The rotation of the inner race causes the shoe portion to experience hydrodynamic drag against the lubricant on the inner race surface. The drag tends to displace the ring relative to the sprag retainer and thereby contact the sprags and pivot them out of surface contact with the inner race. In a second embodiment, the actuating ring takes the form of a sleeve bushing with recesses formed in the inner radial surface. The recesses trap lubricant and create a fluid drag with the inner race surface at relatively high RPM. Again, the drag tends to displace the bushing relative to the sprag retainer and contact the sprags to lift them from the inner race surface in the overrunning mode.

2 Claims, 4 Drawing Sheets

OVERRUNNING CLUTCH WITH CONTROLLED SPRAG ACTION

TECHNICAL FIELD

This invention relates to overrunning clutches of the type employing a plurality of engageable sprags between inner and outer races.

BACKGROUND ART

An overrunning clutch is a well known device for selective transmission of torque between a driving member and a driven member. In a conventional embodiment the clutch comprises a cylindrical outer race and a cylindrical inner race. A plurality of sprags are retained in the radial space between the races. Each sprag essentially functions as a strut placed between the races to mechanically couple them by a wedging action when either race is rotated in the driving direction. However, rotation of either race in the opposite (or overrunning) direction frees the sprags and the races are decoupled. Either race may be the driven member or driving member.

In the overrunning mode of operation each of the plurality of sprags experiences some wear from moving contact with the race surfaces. In applications where high RPM is a normal operating parameter, e.g. electrical power stations, the rubbing contact of the sprags in the overrunning mode can be a limiting factor on clutch life.

DISCLOSURE OF THE INVENTION

The objective of the present invention is to provide an overrunning clutch which means to avoid wear to the sprags when operating in the overrunning mode.

This is accomplished by providing an actuator which is mounted in cooperative relation with the sprag retainer and is responsive to relative motion of the inner race in the overrun direction to move the sprags from contact with the race surfaces. In a first embodiment, the actuator takes the form of an annular member disposed between the races. A plurality of tilt pads are circumferentially distributed about the annular member and are responsive to relative motion in the overrun direction to experience hydrodynamic drag from lubricant on the inner race surface. Such drag tends to angularly displace the annular member relative to the sprag retainer and thereby contact the sprags and lift them from contact with the race surface.

In a second embodiment of the invention, the actuator takes the form of a sleeve bushing surrounding the inner race. The sleeve bushing is formed with recesses in its inner radial surface which function to trap lubricant and create hydrodynamic drag. At relatively high RPM, this drag is sufficient to displace the sleeve relative to the sprag retainer and contact the sprags to lift them from the inner race surface. As a result the clutch experiences reduced sprag wear in the overrun mode.

Other advantages and features of the present invention will be made apparent in the following detailed description of a specific embodiment.

BEST MODE FOR CARRYING OUT THE INVENTION

Figure 1:
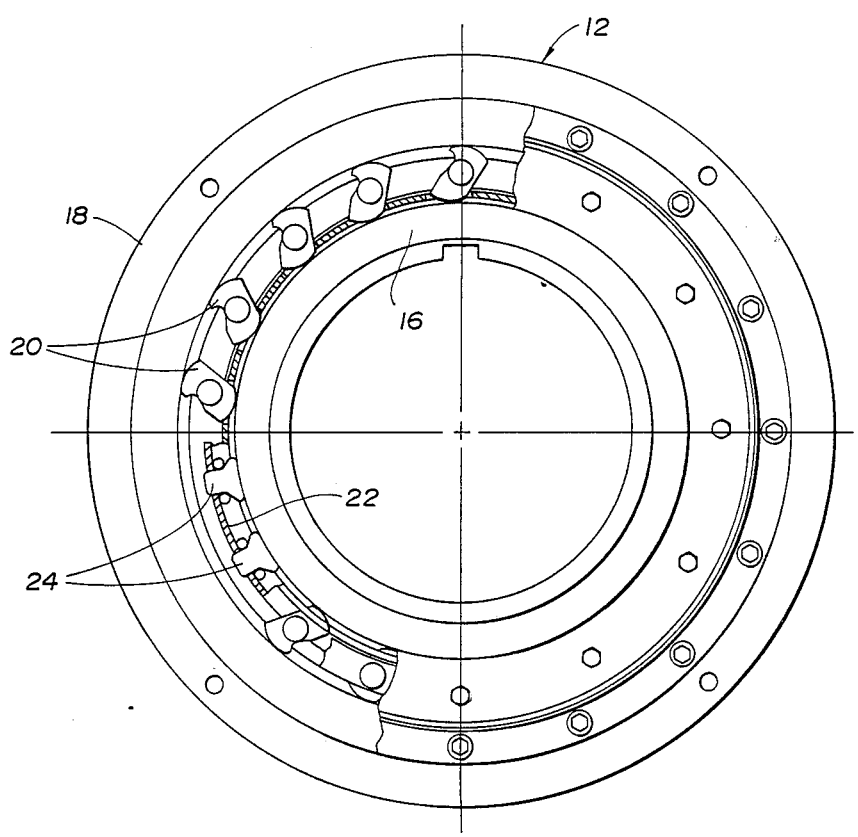
FIG. 1 is a partial sectional view of an overrunning clutch illustrating one embodiment of actuator means of the present invention mounted in cooperation with the clutch sprags.

FIG. 1 illustrates an overrunning clutch, indicated generally at 12, of the type suited for use with the present invention. The overrunning clutch 12 includes an inner race 16, which may couple to a shaft or the like, and an outer race 18. A plurality of sprags 20 are retained in the radial space between the inner race 16 and the outer race 18.

Each sprag 20 is essentially a strut placed between the races 16 and 18 in such a way that it mechanically couples one race to the other by a wedging action when either race is rotated in its driving direction. Rotation in the other direction frees the sprags 20 and the clutch 12 disengages. Either race 16 or 18 may be the driven member or driving member.

Figure 2:
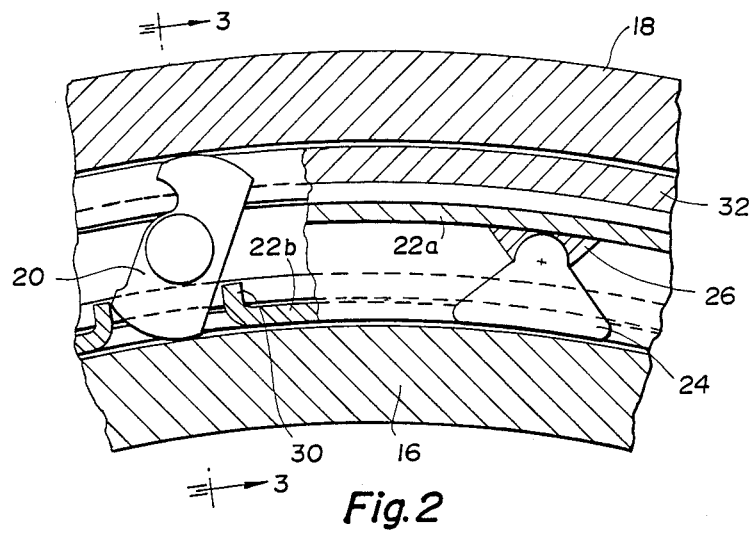
FIG. 2 is an enlarged view of a segment of the clutch of FIG. 1.

FIG. 1 also illustrtes the actuator means of the present invention used to displace the sprags 20 from surface contact with the inner race 16 when the clutch is operated in the overrunning mode. Specifically, the actuator means includes an annular member 22 which carries a plurality of circumferentially distributed tilting pads 24. As best seen in FIG. 2, each tilting pad 24 has a substantially triangular shape with a dependent shoe portion and is suspended for pivotal movement about point "A" from a pendulum mount 26. The mount 26 is connected to and positioned below a carrier segment 22a of the annular member 22. The lower or contact face of the tilt pad 24 is spaced from the surface of the inner race 16 within the range of thickness of the fluid lubricant used with the clutch. The fluid lubricant is supplied under pressure through a gallery 28 in the lower race. In the present invention the fluid lubricant not only lubricates the race surfaces but also assists in developing the desired hydrodynanic drag.

Consequently, when the clutch is operating in its overrunning mode (i.e. counterclockwise in FIG. 2), hydrodynamic drag is experienced between the lower face of the tilt pad 24 and the surface of the inner race 16. This phenomenon tends to move the annular member 22 relative to the retained sprags 20. Specifically, the terminus 30 of the segment 22b of the annular member moves into contact with sprag 20 and displaces it from the surface of the inner race 16. Such displacement of the sprag from contact with the inner race surface reduces sprag wear when the clutch is operated in the overrunning mode.

Figure 3:
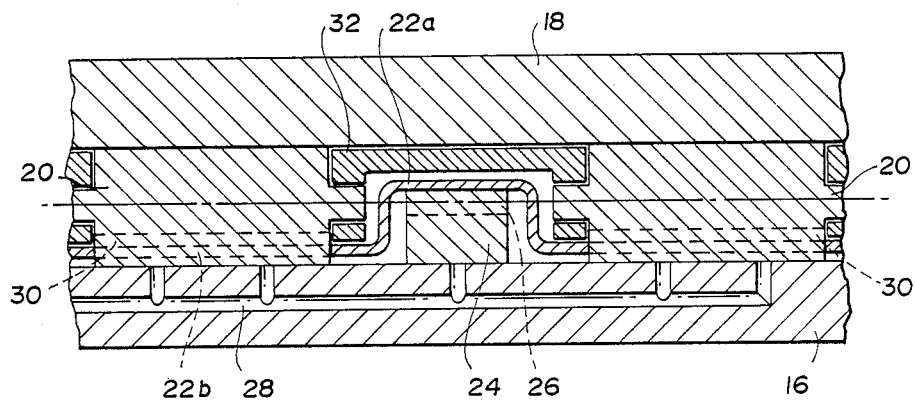
FIG. 3 is a schematic, planar view provided to show the lateral positional relation of the sprags and actuator means of a clutch of the type of FIG. 1.

FIG. 3 illustrates one configuration of actuator means according to the present invention. Specifically, two sets of sprags 20 are carried by retainers 32. The circumferentially distributed array of tilt pads 24 is centrally located and suspended from the carrier segment 22a of the annular member. The other segments 22b of the annular member are disposed outboard of the carrier segment.

Figure 4:
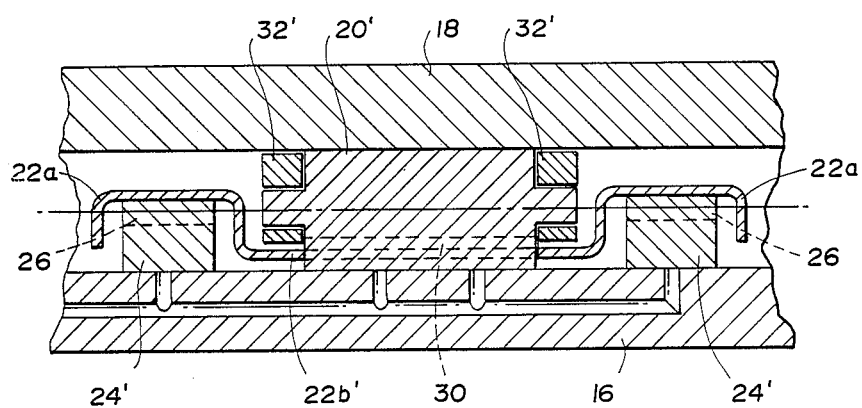
FIG. 4 is another schematic planar view similar to FIG. 3 but showing an alternate arrangement of the actuator means.

FIG. 4 is a view of an alternative arrangement of the actuator means of the present invention. In this example, there are two sets of tilting pads 24' disposed at the outer axial position. A single array of sprags 20' is centrally located and carried by the retainer 32'.

Figure 5:
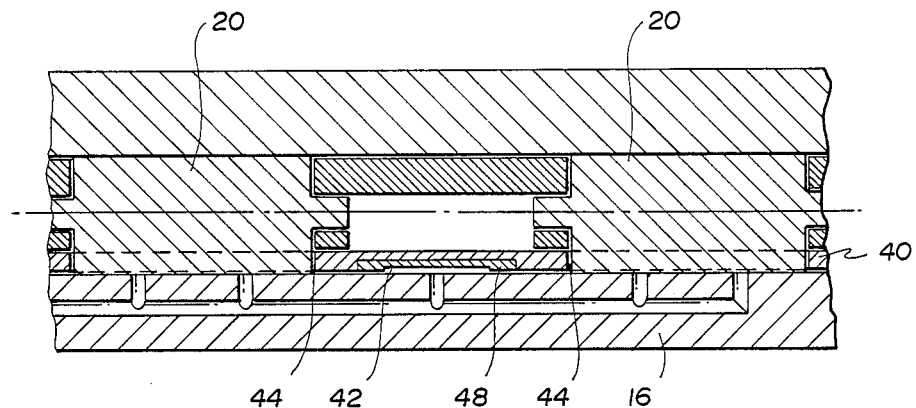
FIG. 5 is a schematic planar view of a second embodiment of actuator means featuring a bushing.
Figure 7:
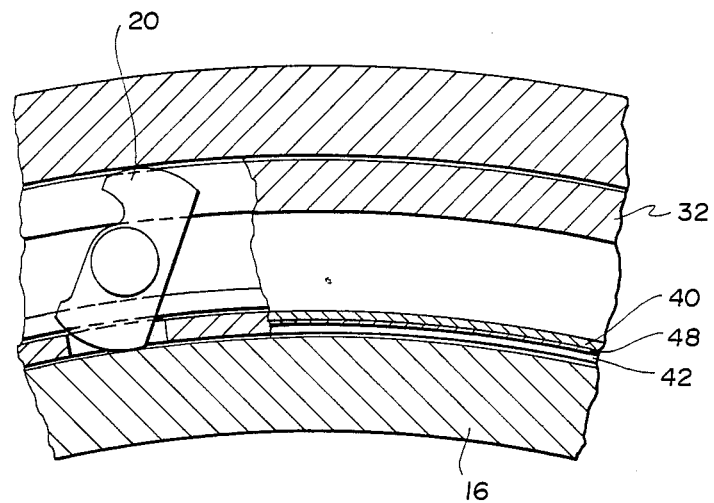
FIG. 7 is an enlarged segmental view of a clutch of the type corresponding to the embodiment of FIG. 5.

FIGS. 5 and 7 illustrate a second embodiment of actuator means. In this embodiment the actuator means comprises a sleeve 40 which surrounds the inner race 16. A bushing 48 is press fit into coupled relationship with the sleeve 40. The bushing 48 is formed with a plurality of circumferentially distributed recesses or pockets 42 in its inner radial surface which function to trap fluid lubricant and create hydrodynamic drag. This drag tends to cause movement of the sleeve 40 relative to the sprags 20. The sleeve 40 is also formed with apertures 44 complementary in shape and like in number to the sprags 20. The bounding edge surfaces of the apertures 44 move into contact with and displace the sprags 20 from contact with the inner race surface to minimize sprag wear in the overrunning mode.

Figure 6:
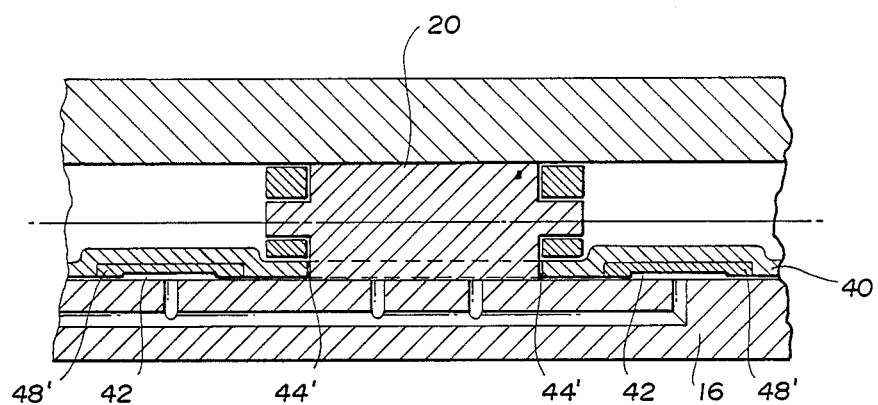
FIG. 6 is another schematic planar view similar to FIG. 5, but showing an alternate arrangement of the second embodiment of the actuator means.
Figure 8:
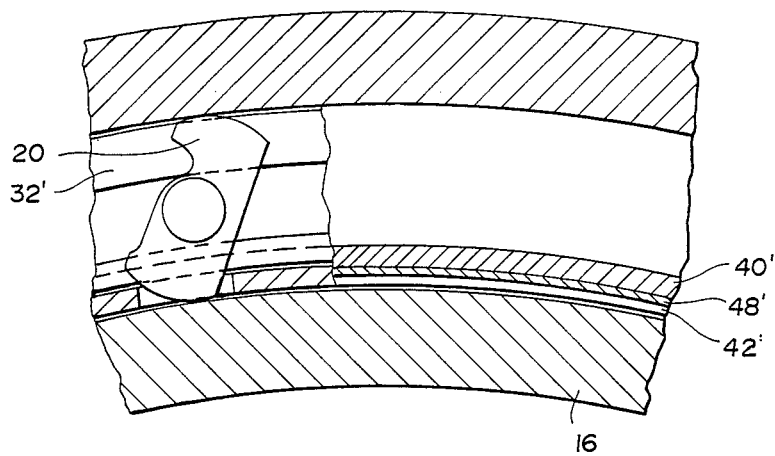
FIG. 8 is an enlarged segmented view of a clutch of the type corresponding to the embodiment of FIG. 6.

FIG. 6 and 8 illustrate an alternative arrangement to the embodiment shown by FIGS. 5 and 7 wherein a single array of sprags 20 is bounded axially by a pair of sleeves 40'. Each sleeve 40' carries a bushing 48' having a plurality of circumferentially distributed recesses or pockets 42 to provide the desired hydrodynamic drag.

Other variations and embodiments of the present invention may suggest themselves to those having skill in the art in light of the above teachings but without departing from the scope of the following claims.

What is claimed is:

1. An overrunning clutch comprising:
an inner race having a contact surface;
an outer race spaced radially from the inner race;
a plurality of sprags carried by a retainer in the radial space between the inner race and the outer race and responsive to rotation of the inner race in one direction for driving engagement with the outer race, and responsive to rotation of the inner race in the opposite direction for nondriving engagement with the outer race; and
actuator means, cooperative with the retainer and responsive to hydrodynamic drag associated with rotation of the inner race in the opposite direction, for actuating the sprags out of surface contact with the inner race to thereby reduce sprag wear, said actuator means including an annular member carrying a plurality of circumferentially-spaced pivotally-mounted tilting pads, each such pad being positioned in close proximity to the inner race and having a lower face spaced radially from the inner race surface for contacting lubricant thereon, and further having contact members for contacting the sprags in response to drag caused by contact of the tilting pads with fluid lubricant on the inner race surface, to move the sprags out of contact with the inner race.

2. An improved overrunning clutch of the type having an inner race with a contact surface, an outer race spaced radially from the inner race, and a plurality of sprags carried in a retainer between the races for engagement thereof when one of the races is rotated in one direction, and disengagement thereof when said race is rotated in the opposite direction, the improvement comprising:
actuator means, cooperative with the retainer and responsive to hydrodynamic drag associated with rotation of said one of the races in the opposite direction, for actuating the sprags out of contact with the inner race surface, said actuator means including an annular member carrying a plurality of circumferentially-spaced, pivotally-mounted tilting pads, each such pad being positioned in close proximity to the inner race and having a lower face spaced radially from the inner race surface for contacting lubricant thereon, and further having contact members for contacting the sprags in response to drag caused by contact of the tilting pads with fluid lubricant on the inner race surface, to move the sprags out of contact with the inner race.

* * * * *